No. 895,111.  
PATENTED AUG. 4, 1908.
N. SCHENK.  
VEHICLE WHEEL.  
APPLICATION FILED DEC. 22, 1906.
2 SHEETS—SHEET 1.
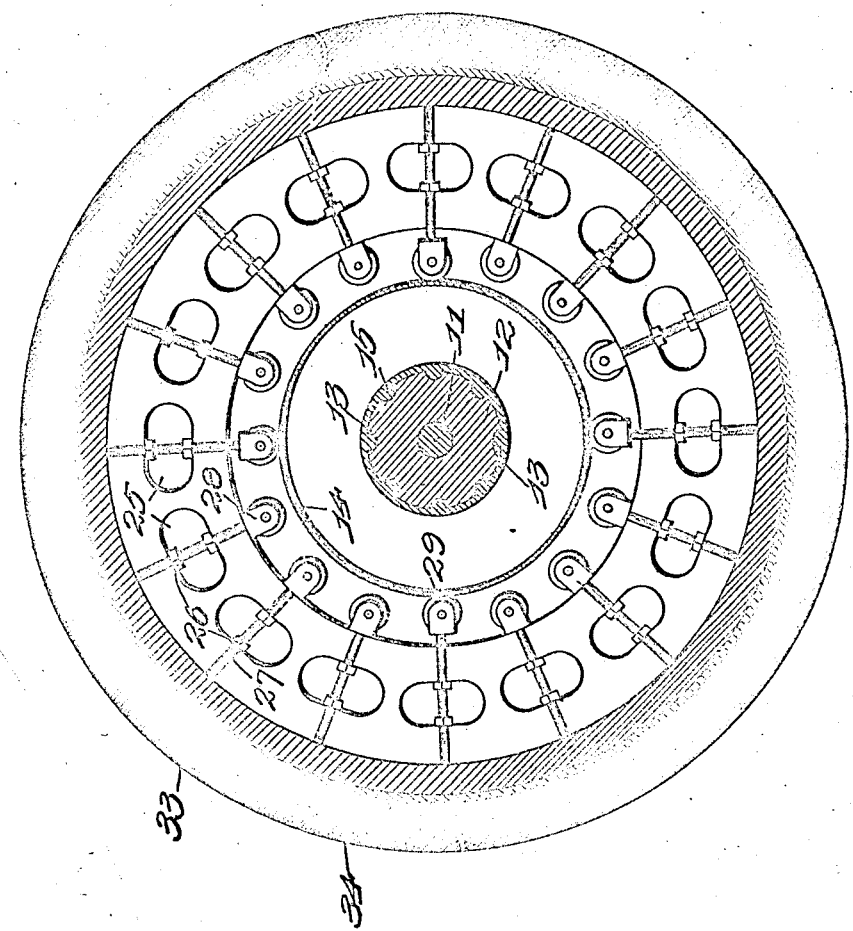
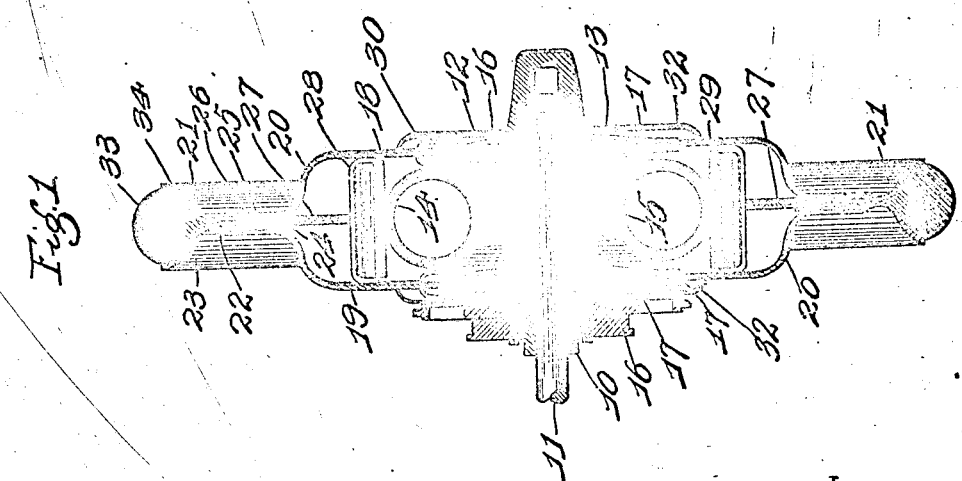
WITNESSES  
INVENTOR  
Nicholas Schenk  
BY Hopkins & Eicks Attys.

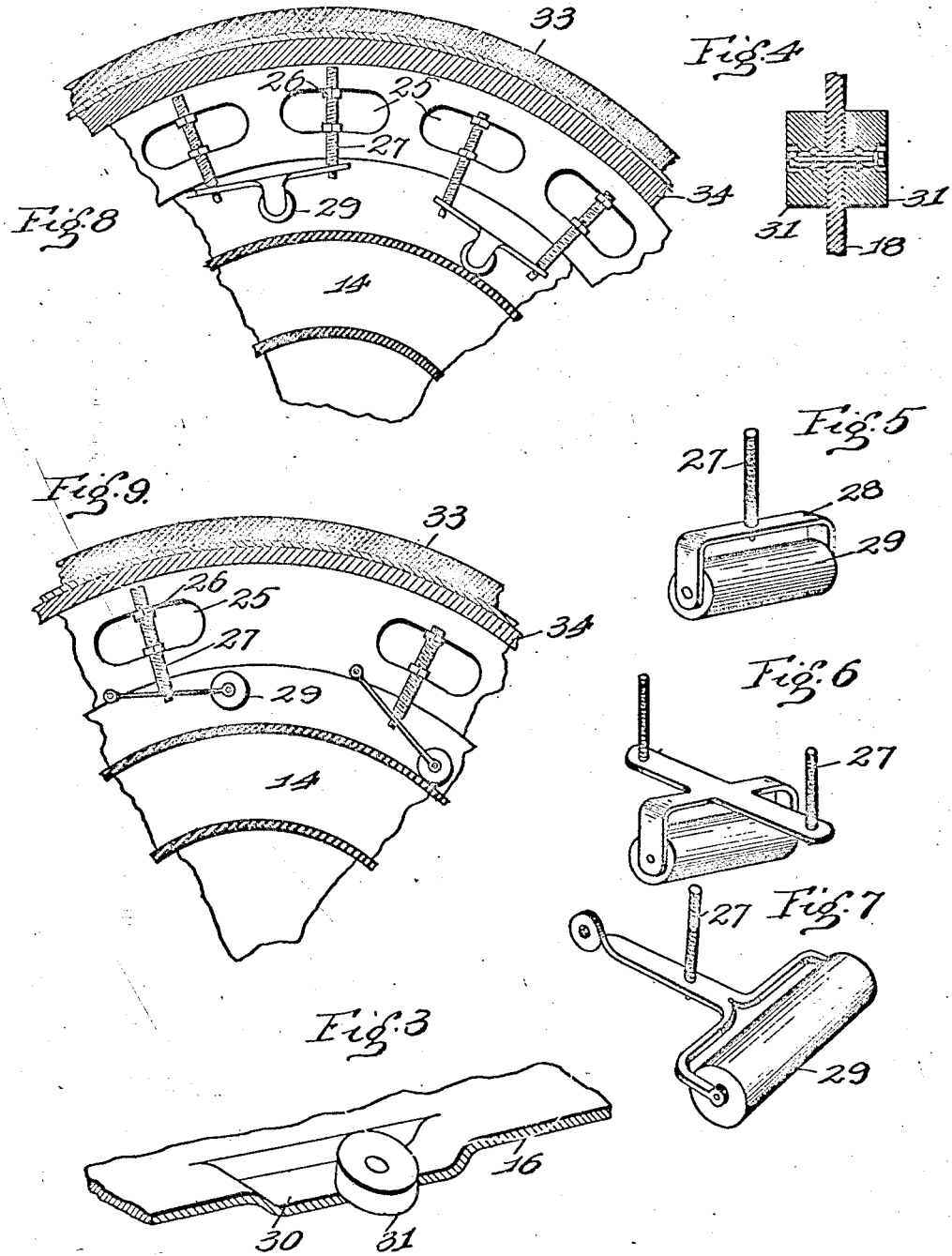

UNITED STATES PATENT OFFICE.

NICHOLAS SCHENK, OF ST. LOUIS, MISSOURI.

VEHICLE-WHEEL.

No. 895,111.   Specification of Letters Patent.   Patented Aug. 4, 1908.

Application filed December 22, 1906. Serial No. 349,039.

*To all whom it may concern:*

Be it known that I, NICHOLAS SCHENK, a citizen of the United States, and resident of St. Louis, Missouri, have invented certain new and useful Improvements in Vehicle-Wheels, of which the following is a specification.

This invention relates to vehicle wheels, and particularly to that type in which an inflated cushion is arranged between a hub section and a rim section that are adapted to move relatively to each other in a vertical plane.

One object of my invention is to provide a wheel of the type referred to in which either the rim section or the hub section is provided with a plurality of adjustable members that bear upon the inflated cushion at several different points.

Another object of my invention is to provide a wheel in which the rim section is formed in a novel manner.

Other desirable features of my invention will be hereinafter pointed out.

Figure 1 is a cross sectional view of a wheel constructed in accordance with my invention; Fig. 2 is a vertical sectional view taken through approximately the center of the wheel; Fig. 3 is a detail perspective view showing a portion of one of the plates of the hub section; Fig. 4 is an enlarged detail sectional view of one of the rollers that is used for transmitting the rotary movement of the hub section to the rim section; Fig. 5 is a detail perspective view of the adjustable bearing member which engages the inflated cushion; Figs. 6 and 7 are detail perspective views showing modified forms of bearing members; and Figs. 8 and 9 are enlarged sectional views illustrating the manner in which the bearing members shown in Figs. 6 and 7 are arranged in position.

Referring to Figs. 1 and 2 of the drawings which illustrate the preferred form of my invention, 10 designates a hub mounted upon a shaft or axle 11. The hub 10 is provided with a central flange or enlarged portion 12 having a plurality of recesses 13 formed in its periphery. Around the portion 12 of the hub is located a pneumatic tube or cushion 14 provided on its inner surface with a plurality of lugs or projections 15 that rest within the recesses 13 formed in the portion 12 of the hub and thus prevent the pneumatic tube from creeping on the hub.

Pairs of plates 16 and 17 are connected to the end portions of the hub, and slidingly mounted between these pairs of plates are plates 18 and 19 which form part of the rim section of the wheel, said plates coöperating with each other to retain the hub section and rim section in vertical alinement and also forming a casing for the pneumatic tube 14. The plates 18 and 19 are bent inwardly toward each other at the point indicated by the reference numeral 20 in Fig. 1. For a short distance outwardly from the point 20 the plates 18 and 19 contact with each other and are riveted together. The plate 18 is provided at its outer edge with a flange 21 which forms half of the rim of the wheel; and the other half of the rim is formed by a separate plate 23 provided with a portion 22 which extends inwardly and is secured to the plates 18 and 19.

A plurality of openings 25 are formed in the plates 18, 19 and 23 to reduce the weight of the wheel and also permit the operator to manipulate the adjustable bearing members hereinafter described. These bearing members consist of rollers 29 mounted in brackets 28 that are provided with threaded stems 27 which are journaled between the plates 18 and 19 and provided with nuts 26 which bear against the edges of the openings 25, as shown in Fig. 2. By manipulating these nuts the rollers can be moved toward and away from the center of the wheel to carry them into and out of contact with the pneumatic cushion 14. As shown in the drawings, a plurality of these bearing members are arranged around the periphery of the pneumatic cushion so that certain of said bearing members may be moved into engagement with the pneumatic cushion for a certain length of time and then moved out of engagement with the cushion and a different group or set of the bearing members be moved into operative position so as to prevent excessive wear on the cushion as would be apt to occur if the bearing members engaged the cushion always at the same points.

In Fig. 2 I have illustrated four of the bearing members as being in engagement with the pneumatic cushion but it will, of course, be understood that any desired number of the bearing members could be moved into operative position. The rotary movement of the hub section is transmitted to the rim section or vice versa by means of rollers 31 mounted on shafts that are journaled in the plates 18 and 19, said rollers being arranged in elongated recesses 30 formed in the plates 16 and 17, said elongated recesses permitting the rim section and hub section to move relatively to each other in a vertical plane but causing them to rotate together. It will, of course, be understood that this same result could be accomplished in various other ways without departing from the spirit of my invention.

The plates 18 and 19, of course, are provided at their centers with enlarged openings to provide for the movement of the hub section, and for preventing dirt and other foreign substances from entering said openings and thus coming in contact with the internal mechanism of the wheel, I have provided cover disks 32 mounted on the hub and having their edges bent inwardly to contact with the outer surfaces of the plates 18 and 19, as shown in Fig. 1. Between the flanges 21 and 23, which form the rim of the wheel, is arranged a wooden core or felly 34 suitably secured in position and provided with a rubber tire or tread 33.

In Figs. 8 and 9 I have shown modified forms of bearing members which, if desired, may be substituted for those shown in Fig. 2. In the form shown in Fig. 8 each of the yokes which carry the rollers is provided with two threaded shanks 27, and in the form shown in Fig. 9 the roller is supported by a pivotally mounted yoke provided with an adjusting shank 27.

From the foregoing it will be seen that when rotary movement is imparted to the hub the rollers 31 and coöperating recesses 30 in the plates 16 and 17, will transmit said movement to the rim section, or if the power be applied to the rim section the coöperating shoulders and rollers will transmit the movement of the rim section to the hub section, thereby enabling the wheel to be used on a car employing an axle drive or one in which the drive chain passes over a sprocket on the rim section of the wheel. As the rim section has only a few separated points of contact with the pneumatic cushion the shocks and jars to which the rim section of the wheel is subjected as it passes over obstructions in the road will be absorbed or taken up by the pneumatic cushion in substantially the same manner that a pneumatic tire absorbs a shock when it passes over an obstruction. Furthermore, the bearing members are adjustable and can be actuated without dismantling the wheel.

Having fully described my invention, what I claim is:

1. A vehicle wheel comprising a hub, an inflated tube located upon said hub, plates located on each side of the inflated tube, a solid rubber tire supported by the plates, rollers carried by the plates to be adjusted to contact with the tube and means for imparting motion to the rim to co-act with the movement of the hub, substantially as specified.

2. A device of the class described comprising a hub, a rim, a tire of solid material carried by the rim, an inflated tube mounted upon the hub and located between said hub and rim, a pair of plates located on each side of the hub and bent inwardly to form the rim supporting the tire, a plurality of contacting rollers located between said plates and arranged to contact with the inflated tube, and means for imparting motion to the rim by the movement of the hub, substantially as specified.

3. A device of the class described comprising a hub having a projection thereon, an inflated tube located upon the projection, a pair of plates located on each end of the hub, a pair of plates located between the first mentioned plates, the said plates bent inwardly acting as spokes to support a tire, a plurality of contacting rollers supported between said plates and arranged to be brought in contact with the periphery of the inflated tube, rollers carried by the plates whereby motion is imparted to the rim by the revolution of the hub, and plates to prevent foreign matter from entering between the said plates, substantially as specified.

4. A device of the class described comprising a hub, a tire, an inflated tube located between the hub and tire, a pair of plates secured to and located on each end of the hub, a pair of plates forming the sides of said wheel each being bent inwardly and terminating in a rim, a plurality of rollers located between said plates and means for adjusting said rollers to contact with the inflated tube, and means for imparting motion between the hub and rim, substantially as specified.

5. A device of the class described, comprising a wheel having a hub and a rim detachably connected, an inflated tube located upon the hub, a series of plates incasing the inflated tube, and a plurality of contacting rollers adjustably carried by the plates and arranged to be brought in contact with the pneumatic tube, substantially as specified.

6. A wheel comprising a hub section, a rim section, an inflated tube mounted on the hub section, means for preventing said tube from rotating relatively to the hub, a plurality of bearing members separated from each other and interposed between the rim and the inflated tube, and means for moving said members into and out of engagement with the tube, substantially as described.

7. A wheel comprising a hub section and a rim section provided with telescoping plates, an inflated tube surrounding the hub of the hub section, bearing members interposed between said tube and the rim, shoulders formed on the plates of one section, and coöperating rollers carried by the plates of the other section to prevent relative rotative movement of said sections; substantially as described.

In testimony whereof, I have signed my name to this specification, in presence of two subscribing witnesses.

NICHOLAS SCHENK.

Witnesses:
ALFRED A. EICKS,
WALTER C. STEIN.